United States Patent [19]
Anderson et al.

[11] 3,727,208
[45] Apr. 10, 1973

[54] SURVEILLANCE SYSTEM AND METHOD FOR USE ABOVE OR BELOW GROUND WITH DIRECTION AND LOCATION OF CROSSING INIDICATION

[75] Inventors: James R. Anderson; Herbert J. Wilde, both of Minneapolis, Minn.

[73] Assignee: Research Incorporated, Eden Prairie, Minn.

[22] Filed: Jan. 11, 1971

[21] Appl. No.: 105,190

[52] U.S. Cl. ..........................340/258 C, 340/258 R
[51] Int. Cl. ..............................................G08b 13/26
[58] Field of Search ......................340/258 C, 258 R

[56] References Cited
UNITED STATES PATENTS

| | | |
|---|---|---|
| 3,237,105 | 2/1966 | Kalmus............................340/258 C |
| 3,230,518 | 1/1966 | Vassil et al.......................340/258 C |
| 3,047,849 | 7/1962 | Hansen.............................340/258 C |
| 3,110,891 | 11/1963 | Herrick et al.....................340/258 C |
| 3,609,679 | 9/1971 | Updegraff.........................340/258 C |

*Primary Examiner*—David L. Trafton
*Attorney*—Dugger, Peterson, Johnson & Westman

[57] ABSTRACT

Two parallel field generating lines are placed either above or below the surface of the ground and are energized with alternating current so that the two lines have a 180° phase relationship with respect to each other. A SENSING line is disposed between the field generating lines. Owing to the out-of-phase relationship, a signal is derived that is indicative of the direction the intruder moves. Zones are provided utilizing different frequencies to define the point at which the intruder crosses. When embedded beneath the ground, the system is unaffected by either wet or dry soil conditions.

6 Claims, 4 Drawing Figures

INVENTOR.
JAMES R. ANDERSON
HERBERT J. WILDE
BY
Dugger, Peterson, Johnson & Westman
Attorneys

SURVEILLANCE SYSTEM AND METHOD FOR USE ABOVE OR BELOW GROUND WITH DIRECTION AND LOCATION OF CROSSING INDIDICATION

BACKGROUND OF THE INVENTION

1. Field of the Invention

This invention relates generally to surveillance or intrusion systems, and pertains more specifically to a system utilizing both capacitive and resistive principles.

2. Description of the Prior Art

Various intrusion systems have been devised in the past. For the most part, these systems have been installed above the ground, this being particularly true where the system has utilized electronic concepts. Any emplacement of an all electronic system beneath the soil surface has met with the serious, if not completely defeating, shortcoming that the groud, when wet, literally swamps out the signal effect produced by the intruder. Quite obviously, where a system is vulnerable to adverse environmental conditions, such as moisture, its usefulness is appreciably restricted and in many instances the installation of such a system connot be even considered because of the attendant low surveillance reliability.

SUMMARY OF THE INVENTION

Accordingly, one object of the present invention is to provide a surveillance or intrusion system that will be exceedingly reliable.

Another object is to provide a surveillance system that can be used either above or below ground.

Another object is to provide an intrusion system that can be installed beneath the soil surface, yet remain completely operable under both wet and dry conditions. In this regard, it is within the purview of the present invention to provide a system that is inherently self-adaptive for even extreme moisture conditions.

Yet another object is to provide an intrusion system that is directional in its operation so that it can be determined whether an intruder is moving from left to right or in an opposite direction. In this regard, it is an aim of the invention to provide a perimeter surveillance system for safeguarding an enclosed area, the system indicating if the person is coming into or leaving the area.

Still further, an object is to provide a zone indication as to where the intruder is actually crossing the installed system.

Additionally, an object of the invention is to provide a system of the foregoing character that will be simple, inexpensive, easily installed and virtually immune to deterioration, particularly from adverse weather.

Briefly, our invention includes the employment of two underground lines or conductors that set up a balanced voltage (or current) gradient in the soil therebetween. An intruder moving along the surface of the soil disturbs this gradient in a manner which couples an alternating current signal into a sensing line disposed between the first two lines. By means of an out-of-phase relationship between the alternating current excitation applied to the first two lines, a signal is sensed by the third line which represents the intruder's direction of movement. Phase-sensitive demodulation produces a polarity reversing direct current signal at its output which is supplied to a suitable alarm, such as appropriately colored lights; one color indicates unauthorized movement in one direction and a contrasting color indicates movement in an opposite direction. Through the agency of a resistive coating on each of the first two lines, the system is enabled to operate under both wet and dry soil conditions. Additionally, through the agency of multiple frequencies applied to the first two lines at spaced stations therealong, the location of crossing can be determined.

DESCRIPTION OF THE PREFERRED EMBODIMENT

Figure 1:
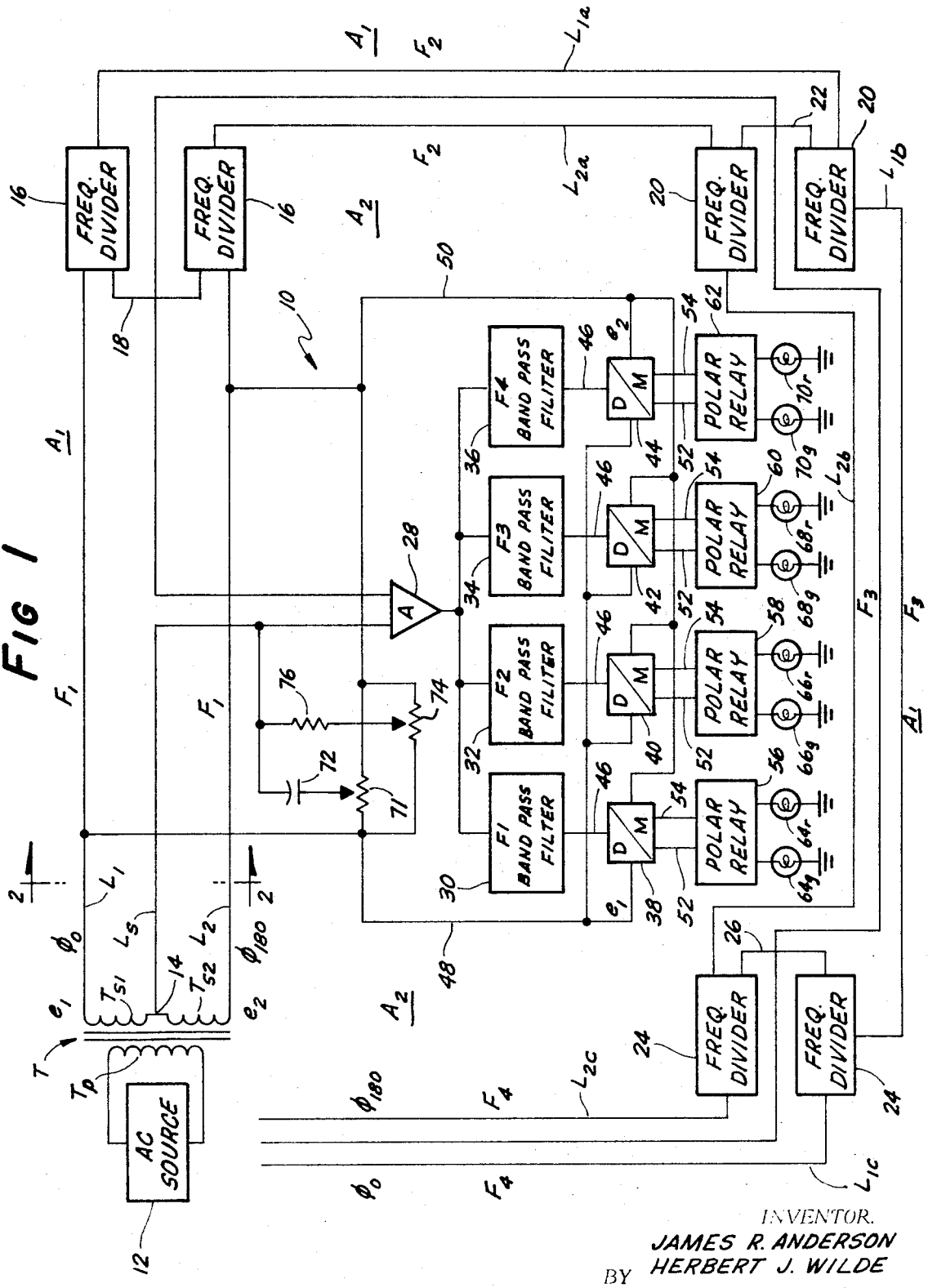
FIG. 1 is a combined schematic and block diagram illustrating our invention when incorporated into a perimeter configuration.

Referring first to FIG. 1, it will be noted that our surveillance or intrusion system has been denoted generally by the reference numeral 10. An alternating current source 12 is connected to the primary winding $T_P$ of a transformer T having secondary windings $T_{S1}$ and $T_{S2}$ having a center tap at 14. A first field generating line or conductor $L_1$ is connected to one end of the secondary winding $T_{S1}$ and a second field generating line or conductor $L_2$ is connected to the other end of the secondary winding $T_{S2}$. The center tap 14 of the transformer T is connected to a sensing line or conductor $L_S$. It will be appreciated that in this way exciting or energizing voltages $e_1$ and $e_2$ are supplied to the lines $L_1$ and $L_2$, respectively, and that these voltages are 180° out-of-phase with each other. Of course, any desired number of pairs of parallel generating line $L_1$ and $L_2$ may be employed, each pair having a sensing line $L_S$ therebetween.

For the sake of discussion, it will be assumed that the frequency of the AC source 12 is $F_1$. The length of the lines $L_1$, $L_2$, $L_S$ is subject to rather wide selection and is not critical to a practicing of the invention, but may be presumed that each section of these lines has a length of approximately 100 meters. Each section would constitute a side of the rectangular enclosure or perimeter appearing in FIG. 1. Although not completely understandable at this stage of the description, fhe frequency $F_1$ will signify when an intruder has crossed the system at this particular side. The frequency $F_1$ is altered as far as the second side at the right of the perimeter is concerned, a pair of signal converters in the form of frequency dividers 16, say, halving the frequency $F_1$ to provide an operating frequncy $F_2$. The frequency dividers 16 are interconnected by a line 18. Of course, the frequency does not have to be divided by a factor of two but can be any multiple of the frequency $F_1$ or can be a frequency completely unrelated to $F_1$, if circumstances so dictate. Although really continuations of the lines $L_1$ and $L_2$, the portions or sections carrying the modified frequency signal provided by the converters or dividers 16 have been labeled $L_{1a}$ and $L_{2a}$, respectively.

The third side is provided with a frequency $F_3$ by means of additional frequency converters or dividers 20 interconnected by a line 22 and the sections of lines $L_1$ and $L_2$ have been identified as $L_{1b}$ and $L_{2b}$. By the same token, the fourth or remaining side involving the line sections $L_{1c}$ and $L_{2c}$ are provided with a frequency $F_4$ through the agency of frequency converters or dividers 24 interconnected by a line 26.

From the foregoing, it should be apparent that an area $A_1$ exists outside the rectangular configuration enclosed by the various line sections $L_1$ and $L_2$, $L_{1a}$ and $L_{2a}$, $L_{1b}$ and $L_{2b}$, and $L_{1c}$ and $L_{2c}$. If an intruder crosses the system from area $A_1$ outside the perimeter to area $A_2$ inside the perimeter, the signal as sensed by the line $L_S$ will be of phase $\phi_0$ as he takes his first step (or steps) across the embedded system and of phase $\phi_{180}$ as he takes his second step (or steps) across the sytem.

It will be observed that the line $L_S$ is connected to an amplifier 28 capable of amplifying signals containing all of the various frequencies $F_1$, $F_2$, $F_3$ and $F_4$ utilized in the system. Connected to the output of the amplifier 28 is a plurality of bandpass filters 30, 32, 34 and 36, the filter 30 passing a narrow band of frequencies corresponding to $F_1$, the filter 32 in turn doing the same for $F_2$, the filter 34 accomplishing the same for the frequency $F_3$, and the filter 36 handling the frequencies corresponding to $F_4$.

The filter 30 is connected to a phase-sensitive demodulator 38, the filter 32 to a demodulator 40, the filter 34 to a demodulator 42 and the filter 36 to a demodulator 44. The lines or conductors providing this connection have been labeled 46. However, in order to make the demodulators 38–44 phase-sensitive, it is necessary to have additional lines 48 and 50 connected to the lines $L_1$ and $L_2$, respectively.

Each phase-sensitive demodulator 38–44 is capable of producing a polarity reversing direct current signal at its output. Schematically, this is evident by the lines 52 and 54 shown associated with each domodulator 38–44. In actual practice a single line would be capable of carrying the signal and its polarity would be determinative of whether the intruder is at that moment crossing from $L_1$ to $L_S$ or $L_S$ to $L_2$ and by the same token in a reverse order.

At any rate, for the purpose of providing a recognizable indication of the direction of intruder movement, a polar or polarity-sensitive relay 56 is connected to the demodulator 38, a corresponding relay 58 to the demodulator 40, a similar relay 60 to the demodulator 42 and finally a fourth such relay 62 to the demodulator 44. A pair of indicating lamps $64_g$ and $64_r$ is connected to the relay 56, a similar pair of lamps $66_g$ and $66_r$ to the relay 58, a like pair $68_g$ and $68_r$ to the relay 60 and a fourth pair of such lamps $70_g$ and $70_r$ to the remaining relay 62. If those lamps having the suffix $g$ is green in color and the lamps having the suffix $r$ are red, then whatever lamp in the bank of lamps 64–70 will signify the particular side of the perimeter that is being traversed by the intruder. The sequential illuminating of a given pair will indicate the direction in which the intruder is moving, that is from area $A_1$ to $A_2$ (if green is followed by red) or from $A_2$ to $A_1$ (if red is followed by green).

Refinements to the circuitry described above can be added in the form of a first potentiometer 71 that nulls out any quadrature AC imbalance, a capacitor 72 being connected to its wiper arm in the accomplishment of this quadrature nulling. A second potentiometer 74 having a resistor 76 connected to its wiper arm nulls out any in-phase imbalance.

Figure 2:
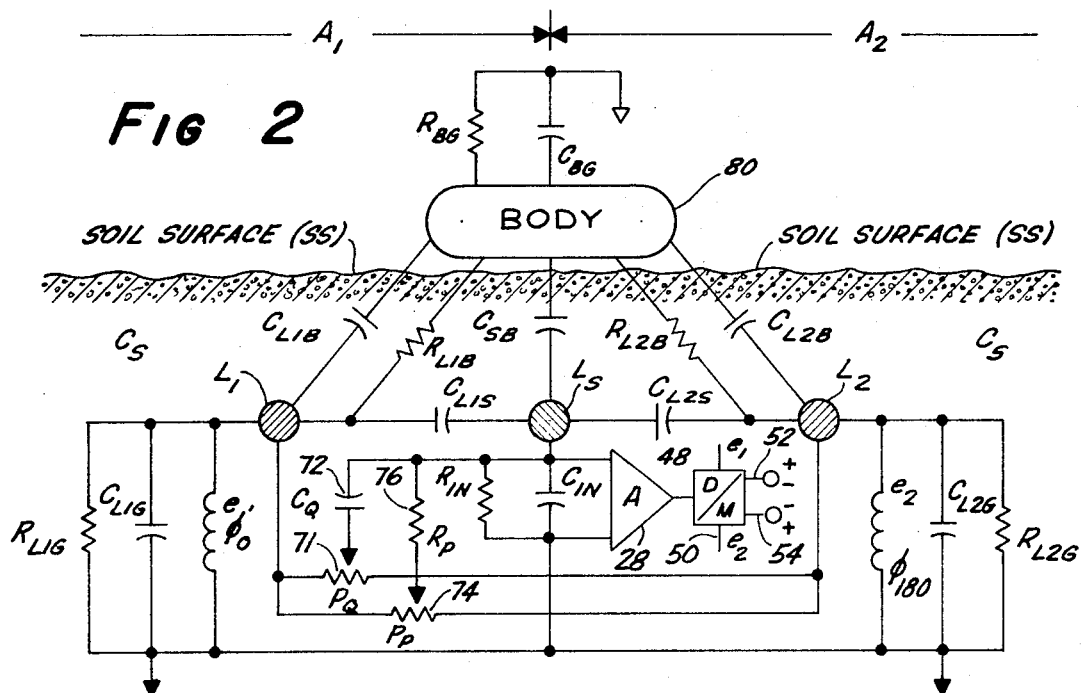
FIG. 2 is a view taken generally in the direction of line 2—2 of FIG. 1 showing the underground lines and certain capacitive and resistive components employed in association therewith plus inherent capacitive and resistive characteristics that are involved in the practicing of our invention.

Inasmuch as our surveillance or intrusion system 10 will find especial usefulness when installed beneath the ground, attention is now directed to FIG. 2 where the soil surface has been labeled SS. In this figure, it is radily apparent that the lines $L_1$, $L_2$ and $L_S$ are all located underground. To orient the reader, the amplifier 28 has been shown, together with the demodulator 38. Still further, the components 71, 72, 74 and 76 have been repeated in this view. Likewise, the secondary windings $T_{S1}$ and $T_{S2}$ (but not the primary winding $T_P$) of the transformer T have been included. Likewise, the body of an intruder has been indicated at 80. Because of the relatively small scale of the lines $L_1$, $L_2$ and $L_S$, they do not lend themselves readily to showing the resistive coatings 82 in this figure that are applied to each of these lines in practice. Consequently, the enlarged representations shown in FIGS. 3 and 4 permit the clearer showing of the resistive coatings 82 that encase or encircle each conductor $L_1$ and $L_2$. Schematically, the coatings 82, which are identical for each conductor $L_1$ and $L_2$, provide resistive paths that have been denoted as $82_r$. Still further, a layer 84 of dielectric or electrical insulation surrounds the sensing line $L_S$. To complete the electrical picture, a troughed ground plate 86 appears, although this plate is not essential in every installation. It perhaps should be explained at this stage that the lines $L_1$, $L_2$ and $L_S$ may be either copper or aluminum, the specific metal not being critical. While the lines or conductors have been depicted as possessing a circular cross section, a flat configuration in actual practice will produce a greater capacitive coupling to the intruder's body 80.

It will be perceived that various electrical characteristic designations have been superimposed on FIG. 1 and it is believed that these will be of benefit in fully understanding the manner in which our surveillance system 10 functions. Accordingly, the following tabulation is the most direct way to explain the superimposed designations, the definitions being:

Body - Intruder
$R_{BG}$ - Resistance: body to soil surface SS
$C_{BG}$ - Capacitance: body to soil surface
$C_{SB}$ - Capacitance: body to sensor
$R_{L1B}$ - Resistance: $L_1$ to body
$C_{L1B}$ - Capacitance: $L_1$ to body
$R_{L2B}$ - Resistance: $L_2$ to body
$C_{L2B}$ - Capacitance: $L_2$ to body
$A_1$ - Area outside boundary
$A_2$ - Area inside boundary
$R_{L1G}$ - Resistance: $L_1$ to SS
$C_{L1G}$ - Capacitance: $L_1$ to SS
$e_1$ - AC voltage on $L_1$ at phase zero
$R_{L2G}$ - Resistance: $L_2$ to SS
$C_{L2G}$ - Capacitance: $L_2$ to SS $e_2$ - AC voltage on $L_2$ at phase 180
$e_{1N}$ - Intrusion signal
$e_O$ - Amplified and demodulated DC signal
$C_Q$ - Quadrature null voltage cap
$R_P$ - In phase null voltage resistance
$P_Q$ - Quadrature nulling potentiometer
$P_P$ - In danger nulling potentiometer
$C_{L1S}$ - Capacitance: Line 1 to sensing line
$C_{L2S}$ - Capacitance: Line 2 to sensing line
$L_1$ - Field generating line
$L_2$ - Field generating line
$L_S$ - Sensing line
A - Intrusion signal amplifier
$R_{IN}$ - Input resistance to amplifier
$C_{IN}$ - Capacitance to amplifier
D/M - Phase sensitive demodulator
SS - Soil surface
$\phi_0$ - $e_1$ voltage 180° from $\phi_0$
$C_S$ - Soil conductivity It is believed evident that when the soil is quite dry, then its soil conductivity will be very minimal. Hence, $R_{L1B}$ is so high as to not have any real influence on the operation of the system. In other words, it is the capacitive effect contributed by $C_{L1B}$ between the line $L_1$ and the body 80 that predominates plus, of course, the capacitive effect $C_{SB}$ between the body 80 and the sensing line $L_S$ that exercises virtual complete control. Hence, it is obvious, it is believed, that the presence of the body 80 upsets the otherwise balanced capacitive condition prevailing between the line $L_1$ and the line $L_S$, for without the body 80 present, the same capacitive relationship exists between the line $L_1$ and $L_S$ as between line $L_2$ and $L_S$.

As already explained, though, the body 80 changes the capacitance first between the lines $L_1$ and $L_S$ if the body is moving from left to right as viewed in FIG. 2, this being from outer area $A_1$ toward the inner area $A_2$. When the body advances farther in the direction of area $A_2$, then the capacitive change occurs with respect to the line $L_2$ and $L_S$. However, owing to the 180° phase relationship existing between the energizing voltages $e_1$ and $e_2$ for the lines $L_1$ and $L_2$, respectively, the output signal $e_O$ from the demodulator 38 reverses as far as its polarity is concerned. Thus, whereas the lamp $64_o$ became illuminated when the intruder moved from $A_1$ into the field provided by the line $L_1$ with respect to the line $L_S$, the lamp $64_r$ becomes lighted where there is a further advancement of the intruder or body 80. Naturally, if the body 80 is moving from the area $A_2$ in the direction of the area $A_1$, this being from right to left as viewed in FIG. 2, them the lamp $64_r$ becomes energized first and then the lamp $64_o$, assuming that the body 80 continues in this direction toward the outside area $A_1$.

If the intruder or body 80 moves in association with the lines $L_{1a}$ and $L_{2a}$, the same action transpires, but in this instance it would be the lamps $66_o$ and $66_r$ that would be energized in sequence. Similarly, if the lines $L_{1b}$ and $L_{2b}$ are crossed, then the lamps $68_o$ and $68_r$ perform the indicating function. Still further, it is believed readily apparent that should the lines $L_{1c}$ and $L_{2c}$ be crossed, then the lamps $70_o$ and $70_r$ are illuminated in sequence. In this way, any observer who is watching the lamps 64–70 will be accurately apprised as to what is taking place.

Figure 3:
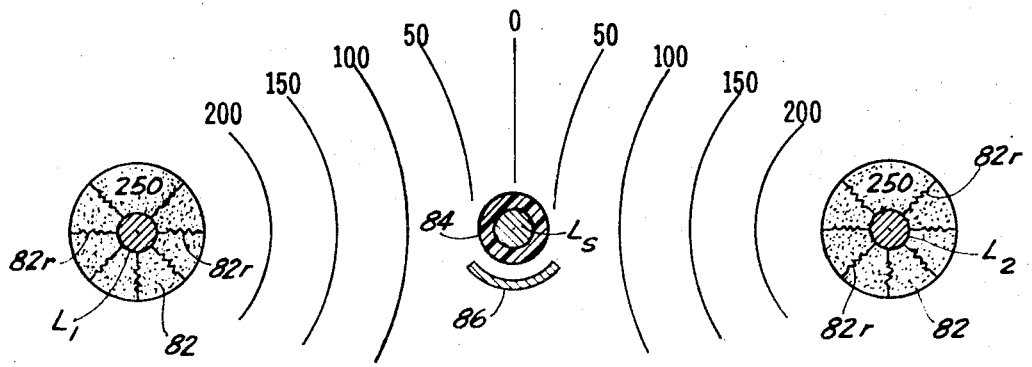
FIG. 3 is an enlarged view of the lines appearing in FIG. 2, the outer or field generating lines having resistive coatings encircling same and the intermediate or sensing line having electrical insulation thereon, and typical voltages that occur when operating under dry soil conditions having been superimposed thereon.

The presence of the resistive coating 82 that encases the lines $L_1$ and $L_2$ has been ignored in the description presented immediately above. It will be of some help, it is believed, to refer to FIG. 3 at this time. FIG. 3 represents a dry soil condition, this being where the soil or conductivity $C_S$ is relatively low, and conversely the soil resistance relatively high, so there is very little flow of current through the soil from the line $L_1$ to the line $L_S$ via a conductive path. Likewise, there is very little flow of current from the line $L_1$ through its resistive coating 82. In other words, the resistance represented by the numeral $82_r$ has virtually no current flowing therethrough and there is consequently virtually no potential drop through the resistive coating 82. Hence, assuming that the voltage $e_1$ equals 250 volts, FIG. 3 clearly shows that the full voltage $e_1$ is applied between the surface of the resistive coating 82 and the line $L_S$. More specifically, $R_{L1B}$ is quite large and the voltage gradient is as illustrated in FIG. 3.

Figure 4:
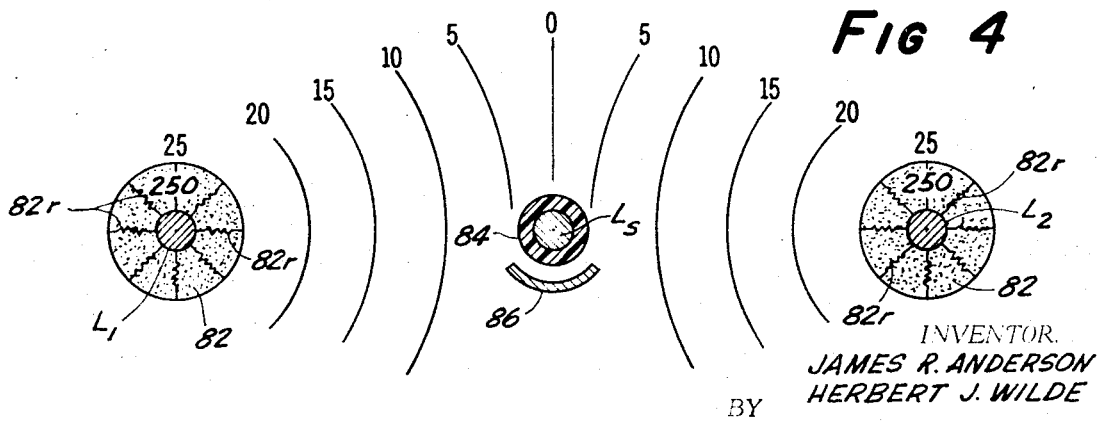
FIG. 4 is a view corresponding to FIG. 3 but illustrating a wet soil operation of our system.

However, when the soil becomes damp or moist, then the situation depicted in FIG. 4 prevails and there is a considerable voltage drop through the resistive coating 82. More specifically, there is a current increase owing to the increased soil conductivity caused by the moisture. Under these circumstances, there is both a capacitive and conductive voltage gradient, the conductive voltage gradient predominating if the soil is quite wet. Stated somewhat differently, $R_{L1B}$ becomes quite small and there is a pronounced flow of current from line $L_1$ to the body 80 and from the body 80 to the sensing line $L_S$.

The preceding dry and wet illustrations are both based on the presence of the body 80 being over the lines $L_1$ and $L_S$. As the body moves to the right, that is toward area $A_2$, then the situation shifts so that the effect is with respect to the line $L_2$ and the sensing line $L_S$.

Recapitulating, FIG. 4 portrays a typical voltage gradient which would exist in wet soil with most of the voltage applied between the lines $L_1$ and $L_2$ dropped in the resistive coating 82 that surrounds these lines or conductors. FIG. 3, on the other hand, depicts the gradient as the ground becomes dry and less conductive, thereby causing a smaller current to flow between the lines $L_1$ and $L_2$ such that very little voltage will be dropped in the resistive coating 82 surrounding these two lines. It is with respect to the dry operating conditions, such as that represented by FIG. 3, that our system 10 operates principally as a capacitive sensing device. The end result, that is the energizing of the lamps 64–70 as to their specific color remains unchanged whether wet or dry soil conditions are encountered. Likewise, the determining of which portions of the lines $L_1$ and $L_2$ are being crossed remain unchanged whether the soil is wet or dry. Consequently, it is believed fairly apparent that our system produces reliable results in accordance with what has above been given in the way of operational explanation.

It will be appreciated, especially with respect to the ensuing claims, that the terms "lines" is to be construed as embracive of lines $L_1$ and $L_2$ or at lines $L_1$ and $L_2$ plus one or more of the additional sections comprised of $L_{1a}$ and $L_{2a}$, $L_{1b}$ and $L_{2b}$, $L_{1c}$ and $L_{2c}$, the additional subscripts a, b and c serving to identify specific portions of the field generating lines where unauthorized crossings might occur.

We claim:

1. A surveillance system for determining the presence of a body on the surface of soil and in the vicinity of said system, the system comprising spaced first and second electrical conductor lines mounted in the soil, said lines each having a resistive coating thereon to effect a voltage drop through the resistive coating during current flow from said lines through said soil, a third lines disposed between said first and second lines, said third line having a layer of dielectric material thereon, means energizing said first and second lines with alternating current, said third line being positioned and of a potential so as to receive electrical signals from said first and second lines respectively, and means for sensing a change in the signal received by said third line to denote the presence of a body that has moved into a proximal relation with said first and third lines or into a proximal relation with said second and third lines.

2. A surveillance system in accordance with claim 1 in which said energizing means excites said second line with alternating current having a different phase relationship from that with which said first line is excited, said sensing means being phase sensitive.

3. A surveillance system in accordance with claim 2 in which there is a 180° phase relationship between said exitation currents.

4. A surveillance system in accordance with claim 3 in which said sensing means includes an amplifier and a phase-sensitive demodulator.

5. A surveillance system in accordance with claim 4 including signal means connected to the output of said demodulator for indicating the direction of body movement.

6. A surveillance system in accordance with claim 5 in which said signal means includes a pair of differently colored lights, the sequential illumination of said lights indicating the direction of body movement.

7. A surveillance system for determining the presence of a body on the soil surface in the vicinity of said system, the system comprising first, second and third lines buried below the soil surface and subjected to differing soil electrical conductivity, said third line being intermediate said first and second lines, means energizing said first line with alternating current having one electrical characteristic, means energizing said second line with alternating current having a different electrical characteristic, said first and second lines having resistive coatings thereon resulting in voltage drops across the resistive coatings commensurate with soil conductivity, and means associated with said third line for discriminating between said characteristics.

8. A surveillance system in accordance with claim 7 in which said last-mentioned means provides an output signal indicative of said characteristics.

9. A surveillance system in accordance with claim 7 in which said characteristics provide a different phase relationship.

10. A surveillance system in accordance with claim 7 in which said characteristics provide a different frequency relationship.

11. A surveillance system in accordance with claim 10 wherein said lines define the perimeter of an area under surveillance including a plurality of electronic signal converters in said first line for altering the frequency of said alternating current at spaced stations along said first line, said spaced stations defining known locations along the perimeter of said area.

12. A surveillance system in accordanc with claim 11 including a plurality of electronic signal converters in said second line for altering the frequency of said alternating current at spaced stations, both the spacing of said last-mentioned stations and the frequency thereof corresponding to that of said first-mentioned stations.

13. A surveillance system in accordance with claim 12 in which the particular frequency at each station in said second line is out-of phase with the frequency for the corresponding station in said first line.

14. A surveillance system in accordance with claim 13 in which said discriminating means is both frequency and phase sensitive.

15. A surveillance system embedded below the surface of the soil for determining the presence of a body on the soil surface in the vicinity of said system, said system comprising electrical lines extending below the soil at the perimeter of an area under surveillance by said system and through soil having at times differing electrical conductivity, said system comprising at least one electrical field generating line means having a resistive coating thereon which causes a voltage drop through said coating as a function of soil conductivity, and sensing line means spaced from said field generating line means and in position to receive electrical signals which are a function of the electrical potential difference between said field generating line means and said sensing line means, whereby the presence of a body on the soil surface adjacent to said generating line means and said sensing line menas influences the signal received by said sensing line means from said generating line means.

16. A surveillance system in accordance with claim 15 wherein said resistive coating is selected to provide a current limiting effect on current flow from said field generating line means through soil of differing conductivity.

* * * * *